US009454500B2

(12) United States Patent
Evers et al.

(10) Patent No.: US 9,454,500 B2
(45) Date of Patent: Sep. 27, 2016

(54) NETWORK COMMUNICATION CONTROL APPARATUS, SYSTEM AND METHOD

(71) Applicant: NXP B.V., Eindhoven (NL)

(72) Inventors: Rainer Evers, Hamburg (DE); Martin Wagner, Norderstedt (DE)

(73) Assignee: NXP B.V., Eindhoven (NL)

( * ) Notice: Subject to any disclaimer, the term of this patent is extended or adjusted under 35 U.S.C. 154(b) by 679 days.

(21) Appl. No.: 13/919,791

(22) Filed: Jun. 17, 2013

(65) Prior Publication Data

US 2014/0372647 A1 Dec. 18, 2014

(51) Int. Cl.
*G06F 13/00* (2006.01)
*G06F 13/362* (2006.01)
*G06F 13/40* (2006.01)
*H04L 25/02* (2006.01)

(52) U.S. Cl.
CPC ......... *G06F 13/362* (2013.01); *G06F 13/4072* (2013.01); *H04L 25/028* (2013.01); *Y02B 60/1228* (2013.01); *Y02B 60/1235* (2013.01)

(58) Field of Classification Search
CPC ............ G06F 13/362; G06F 13/4072; H04L 25/028; Y02B 60/1228; Y02B 60/1235
USPC ........................................................ 710/110
See application file for complete search history.

(56) References Cited

U.S. PATENT DOCUMENTS

| | | | | | |
|---|---|---|---|---|---|
| 3,749,945 | A | * | 7/1973 | Ammann | G11C 7/1048 326/18 |
| 4,413,300 | A | * | 11/1983 | Sumi | H04L 25/028 330/207 P |
| 4,810,969 | A | * | 3/1989 | Fulkerson | H03K 19/01707 326/102 |
| 4,825,099 | A | * | 4/1989 | Barton | H03K 17/6872 323/315 |
| 4,962,345 | A | * | 10/1990 | Crafts | H03K 17/6871 327/108 |
| 5,247,207 | A | * | 9/1993 | Wert | H03K 17/567 327/108 |
| 5,296,765 | A | * | 3/1994 | Williams | H03K 17/164 327/108 |
| 5,559,502 | A | * | 9/1996 | Schutte | H04J 3/0641 340/9.1 |
| 6,031,389 | A | * | 2/2000 | Fotouhi | H03K 19/00361 326/31 |
| 6,388,463 | B1 | | 5/2002 | Mores | |
| 6,836,173 | B1 | * | 12/2004 | Yang | H03K 17/063 326/88 |
| 7,095,246 | B2 | * | 8/2006 | Kiyoshi | H03K 17/04206 326/30 |
| 7,688,113 | B2 | * | 3/2010 | Nascimento | G06F 13/4072 326/82 |
| 8,446,173 | B1 | * | 5/2013 | Faucher | H03K 19/00361 326/27 |
| 2002/0075044 | A1 | * | 6/2002 | Hinterscher | H03K 19/00315 327/108 |
| 2002/0149404 | A1 | | 10/2002 | De Haas et al. | |
| 2002/0154651 | A1 | | 10/2002 | De Haas et al. | |
| 2005/0140425 | A1 | * | 6/2005 | Adams | H03K 5/1252 327/427 |

(Continued)

FOREIGN PATENT DOCUMENTS

CN 103034202 A 4/2013
WO 96/17305 A2 6/1996

OTHER PUBLICATIONS

MCP2022 Datasheet 2009.*
MCP2025 Datasheet 2012.*
TLE8458Gx Lin Ttansceiver with integrated Low Drop Voltage Regulator LIN-LDO Apr. 2009.*
Texas Instruments Lin Physical Interface SN65HVDA100-Q1, Nov. 2011.*

(Continued)

*Primary Examiner* — Paul R Myers

(57) ABSTRACT

Aspects of the present disclosure are directed to single-wire bus communications. In accordance with one or more embodiments, a pull-up current is delimited when a single-wire bus circuit is operated at a dominant level during the transmission of data on the single-wire bus circuit. This approach can be implemented to facilitate power savings, such as in applications involving a master control circuit that transmits signals by driving the single-wire bus circuit between dominant and recessive levels.

20 Claims, 5 Drawing Sheets

(56) References Cited

U.S. PATENT DOCUMENTS

| | | | |
|---|---|---|---|
| 2008/0042696 A1* | 2/2008 | Redoute | H03K 17/166 327/108 |
| 2008/0303546 A1* | 12/2008 | Millar | G11C 5/063 326/30 |
| 2009/0051393 A1* | 2/2009 | Kamenicky | H03F 1/52 327/108 |
| 2011/0144840 A1* | 6/2011 | Ye | B60K 6/46 701/22 |
| 2011/0199131 A1 | 8/2011 | Boezen | |

OTHER PUBLICATIONS

TJA1020 Lin Transceiver Jul. 17, 2002.*
EL-MOS Semiconductor AG E910.48 Lin transceiver with voltage regulator and watchdog Mar. 23, 2007.*
LIN Specification Package; Revision 2.2A, Dec. 31, 2010.
SAE J2602/1 LIN Network for Vehicle Applications, revised 2012, available from SAE International (copy unavailable).
Extended European Search Report for European Patent Appln. No. 14172220.7 (Sep. 4, 2014).

* cited by examiner

NETWORK COMMUNICATION CONTROL APPARATUS, SYSTEM AND METHOD

Aspects of various embodiments are directed to communications, and to the control of power-based characteristics thereof.

A variety of communication networks are used in different applications and environments. For example, industrial, automotive and other industries have used communication networks to facilitate the control of and/or communication between various devices. These communications have been increasingly used to suit various needs. In particular, the automotive industry has seen increased use of network communications for a variety of uses, such as for controlling communication circuits relating to the operation of a vehicle.

One type of communication network that is being increasingly used for various applications is a single-wire network, such as the LIN (local interconnect network). Referring to the LIN by way of example, such a network includes a master and a number of slaves connected for communication over a single-wire interface, which can be based on a standard UART (Universal Asynchronous Receiver Transmitter). The network is time-triggered and controlled by a master circuit that includes a scheduler and multiple slaves that synchronize their local oscillator to the first part of the message (header) sent by the master. The slave ("addressed" by the header) completes the message by inserting the response field.

LIN master (electronic) control units communicate over the single-wire interface (and network) using a pull-up resistor that is generally the main contributor to the network pull-up current. This pull-up resistor is useful in ensuring proper communication and control of the network. However, such an approach can cause significant power dissipation, which can further result in temperature increases in the control unit and, in turn, cause problems with various circuits.

These and other issues continue to present challenges to the implementation of circuits in a variety of applications, and in particular to applications utilizing communication components and networks such as those used in a LIN.

Various example embodiments are directed to network communication circuits and their implementation.

According to an example embodiment, an apparatus includes a voltage source, a master control circuit, an impedance-bias circuit and a current delimiter circuit connected between the voltage source and the impedance-bias circuit. The master control circuit transmits signals by driving a single-wire bus circuit at a dominant level and at a recessive level. The impedance-bias circuit operates with the voltage source to pull up a voltage level on the bus circuit while the master control circuit transmits the signals, with a corresponding pull-up current flowing via the impedance-bias circuit. The current delimiter circuit delimits the pull-up current in response to a transition of the bus circuit from the recessive level to the dominant level, and ceases delimiting of the pull-up current in response to a transition of the bus circuit from the dominant level to the recessive level.

Another example embodiment is directed to an apparatus having a system controller, a plurality of communication circuits, and a voltage regulator that regulates supply voltage provided by a battery. The system controller has a serial peripheral interface and operates to communicate (e.g., receive) serial data, a chip select signal and a clock synchronization signal using the regulated power. Each communication circuit includes a master control circuit and a transceiver control circuit and operates to communicate data, using the regulated supply voltage, on the single-wire bus circuit. Each circuit on the bus communicates on a channel that is independent from a channel that at least another one of the communication circuits uses. The master control circuit generates and communicates signals on the channel by driving the single-wire bus circuit between a recessive level and a dominant level based upon the serial data and clock synchronization signal communicated via the serial peripheral interface. The transceiver control circuit includes a pull-up circuit that uses the battery power to pull up a voltage level on the single-wire bus circuit, using a corresponding pull-up current that flows through the pull-up circuit. The transceiver also includes a current delimiter that delimits the pull-up current in response to the master control circuit driving the single-wire bus circuit from the recessive level to the dominant level. The current delimiter ceases delimiting the pull-up current in response to the master control circuit driving the single-wire bus circuit from the dominant level to the recessive level.

Another embodiment is directed to a method in which signals are transmitted by driving a single-wire bus circuit at a dominant level and at a recessive level. Using a voltage source, a voltage level on the bus circuit is pulled up while the signals are transmitted. A pull-up current used to pull up the voltage level is delimited in response to a transition of the bus circuit from the recessive level to the dominant level, and delimiting of the pull-up current is ceased in response to a transition of the bus circuit from the dominant level to the recessive level.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
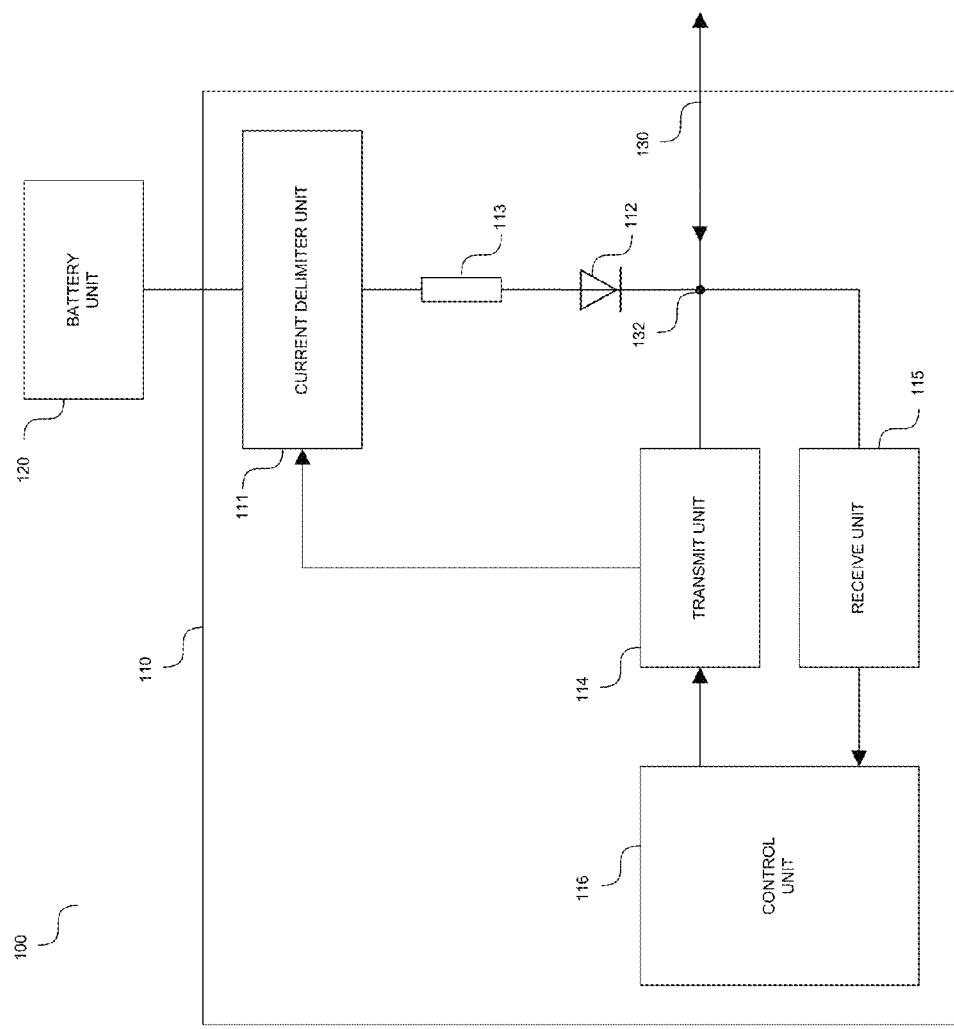
FIG. 1 shows a communication control apparatus, in accordance with an example embodiment of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving communications in networks and to reducing power dissipation therein, such as for reducing power dissipation for a LIN master ECU (Electronic Control Unit). While not necessarily so limited, various aspects may be appreciated through a discussion of examples using this context.

Various example embodiments are directed to communicating on a bus, such as a single-wire bus that may be used in LIN-type communications, while delimiting current used to pull up a voltage level on the bus. Such an approach can be used to facilitate power savings, for example, in a master-slave environment in which the master transmits using a pull-up current that largely contributes to overall pull-up current usage for the bus communications. In certain such embodiments, a master is connected to one or more slave units and transmits signals on the bus by alternately driving the bus at dominant and recessive levels (e.g., at a ground-region level and a level provided by a battery). During some or all of the time at which the master drives the bus at the dominant level, a current delimiter operates to delimit current. In some implementations, the current delimiting is ceased when the master drives the bus to the recessive level. Using this approach, current draw can be limited while the master drives the bus at the dominant level, thus limiting power consumption of bus operation, and addressing challenges such as those discussed above.

Another embodiment is directed to an apparatus and/or system that implements current delimiting during pull-up of a single-wire bus, such as described above. An apparatus includes a voltage source, a master controller, an impedance-bias (e.g., pull-up) circuit, and a current delimiter connected between the voltage source and the pull-up circuit, all of which operate to facilitate communications with devices connected on a single-wire bus (e.g., a LIN bus). The voltage source operates to provide current using battery power, such as power from an automotive battery. The master controller transmits signals by driving the single-wire bus at dominant and recessive levels while the impedance-bias circuit uses the voltage source to pull up a current on the bus. The current delimiter delimits the pull-up current while the bus is driven at the dominant level.

The current delimiter is implemented in a variety of manners, to suit respective applications and embodiments. In some embodiments, the current delimiter delimits the pull-up current in response to a transition of the bus from the recessive level to the dominant level, and ceases delimiting the pull-up current in response to a transition of the bus from the dominant level to the recessive level. This delimiting may be effected, for example, by restricting current flow from the apparatus onto the bus. In some embodiments, the current delimiter circuit includes MOS-based transistors that delimit the pull-up current by operating in a non-conducting state and cease delimiting the pull-up current by operating in a conducting state.

In various embodiments, the master control circuit operates the current delimiter directly and/or by providing an output indicative of the state (dominant/recessive) of signals being driven. In some embodiments, the master control circuit transmits signals by driving the bus between the recessive and dominant levels while intermittently operating the current delimiter to delimit the pull-up current when the bus is driven at the dominant level.

The current delimiter is operated in one or more of a variety of fashions, to suit particular embodiments. In one or more embodiments, the current delimiter (e.g., controlled by the master control circuit) initiates delimiting the pull-up current during the transition of the bus circuit from the recessive level to the dominant level, and ceases delimiting the pull-up current during the transition of the bus circuit from the dominant level to the recessive level. In another such embodiment, the current delimiter initiates delimiting the pull-up current after the bus circuit has transitioned from the recessive level to the dominant level, and ceases delimiting the pull-up current before the bus circuit has transitioned from the dominant level to the recessive level. Other embodiments are directed to a combination of such approaches, such as by initiating delimiting of the current while the bus transitions to the dominant level and ceasing delimiting of the current before the bus circuit has transitioned to the recessive level.

In a more particular embodiment, an apparatus as above also includes the (e.g., single-wire) bus as well as a master circuit and a plurality of slave circuits connected to the single-wire bus. The master circuit includes a voltage source and an integrated circuit chip having a master controller, the impedance-bias circuit and current delimiter as discussed above. In a more particular implementation, the apparatus includes a serial peripheral interface, and the master controller generates and communicates signals on respective channels on the bus circuit based upon serial data and a clock synchronization signal received via the serial peripheral interface.

Various embodiments as discussed above are directed to apparatuses, systems and/or methods that implement the respective operations. One such method-based embodiment operates by transmitting signals via driving a single-wire bus at dominant and recessive levels, pulling up a voltage on the bus while the signals are transmitted, and delimiting the corresponding pull-up current in response to a transition of the bus from the recessive level to the dominant level. The current delimiting is ceased in response to a transition of the bus circuit from the dominant level to the recessive level. Such a method may, for example, involve using a master to drive the bus at the dominant and recessive levels to transmit data to one or more slaves connected to the bus, while delimiting the pull-up current when the bus is driven at the dominant level. The slaves can then transmit data to the master by driving the single-wire bus circuit in response to the data transmitted by the master. Delimiting may be carried out using approaches such as described above, or mixed embodiments therein.

FIG. 1 shows a communication control apparatus 100, in accordance with one or more example embodiments of the present disclosure. The apparatus 100 includes a communication device 110 and a battery unit 120, such as an automobile battery/circuit, that powers the communication device. A current delimiter unit 111 is connected between the battery unit 120 and an impedance-bias circuit including a diode 112 and resistor 113. A transmit unit 114 and a receive unit 115 operate in response to a control unit 116 to drive a communication bus 130 via node 132 under respective conditions for transmitting and receiving data.

The diode 112 and resistor 113 of the impedance-bias circuit operate with the battery unit 120 to pull up the voltage on the communication bus 130 at node 132, when the transmit unit 114 is driving the communication bus (e.g., respectively at dominant and recessive levels) for transmitting signals thereupon. In such a transmit condition, the current delimiter unit 111 operates to delimit current flow via the battery unit 120 (voltage source) and the impedance-bias circuit onto the communication bus 130, when the bus is driven to the dominant level. In a receive mode, the receive unit 115 receives signals on the communication bus 130.

Using this approach, pull-up current can be limited in the master, which can be helpful in reducing overall current consumption when the master exhibits a relatively large current draw. For instance, while the resistor 113 in FIG. 1 can be implemented with a relatively low-resistance of about 1 kΩ, a larger resistance, such as 30 kΩ, can be used within slave devices coupled on the bus. Furthermore, this approach can be used to mitigate temperature rise in the resistor 113, which can be of particular importance when the resistor 113 is integrated with other circuits in the device 110.

Figure 2:
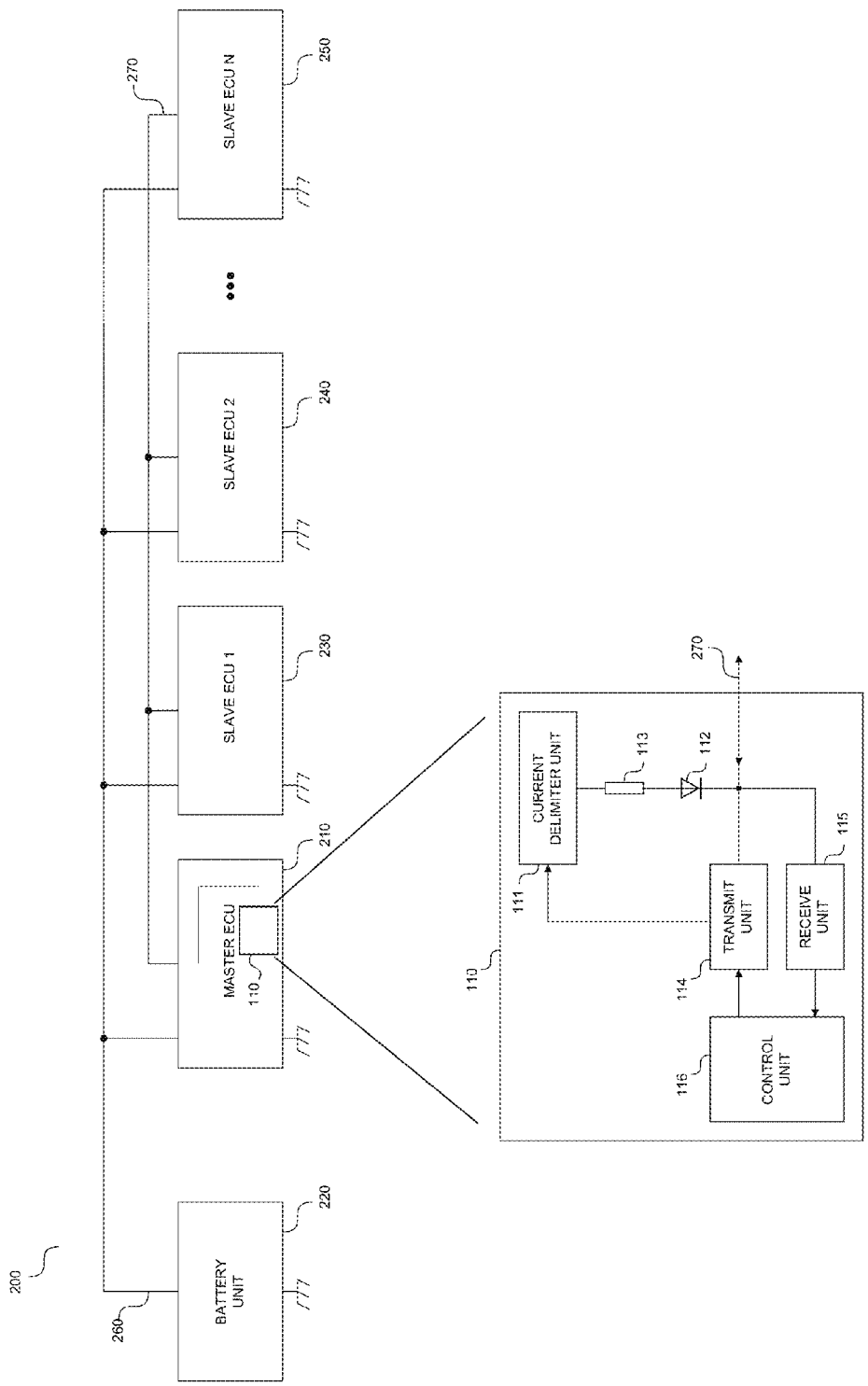
FIG. 2 shows a network apparatus 200 with a master control unit and several slave units, in accordance with another example embodiment of the present disclosure.

FIG. 2 shows a network apparatus 200 with a master control unit 210 and several slave units 230, 240 and 250 connected on a single-wire bus 270 (e.g., a wired AND bus), in accordance with another example embodiment of the present disclosure. The apparatus 200 includes a battery unit 220, such as a 12V vehicle battery, that powers each of the respective master and slave units 210, 230, 240 and 250 via power line 260, all of which are connected to a common ground. By way of example, the master control unit 210 is shown including the communication control device 110 shown in and described in connection with FIG. 1 above. Various embodiments are directed to implementations of the master control unit 210 with other control circuits and/or devices, which may or may not include the control device 110.

Using the control device 110 by way of example (as exemplified in the inset), the master control unit 210 is the main contributor to communications on the bus 270, and further consumes most power for the communication. The current delimiter 111 operates to delimit current while the master control unit 210 transmits by operating the bus 270 at a dominant level, and releases the bus to a recessive level at which the slave units 230, 240 and 250 communicate. The apparatus 200 uses the battery voltage supplied by the battery unit 220 to operate at the recessive level, and uses the ground as the dominant level.

Figure 3:
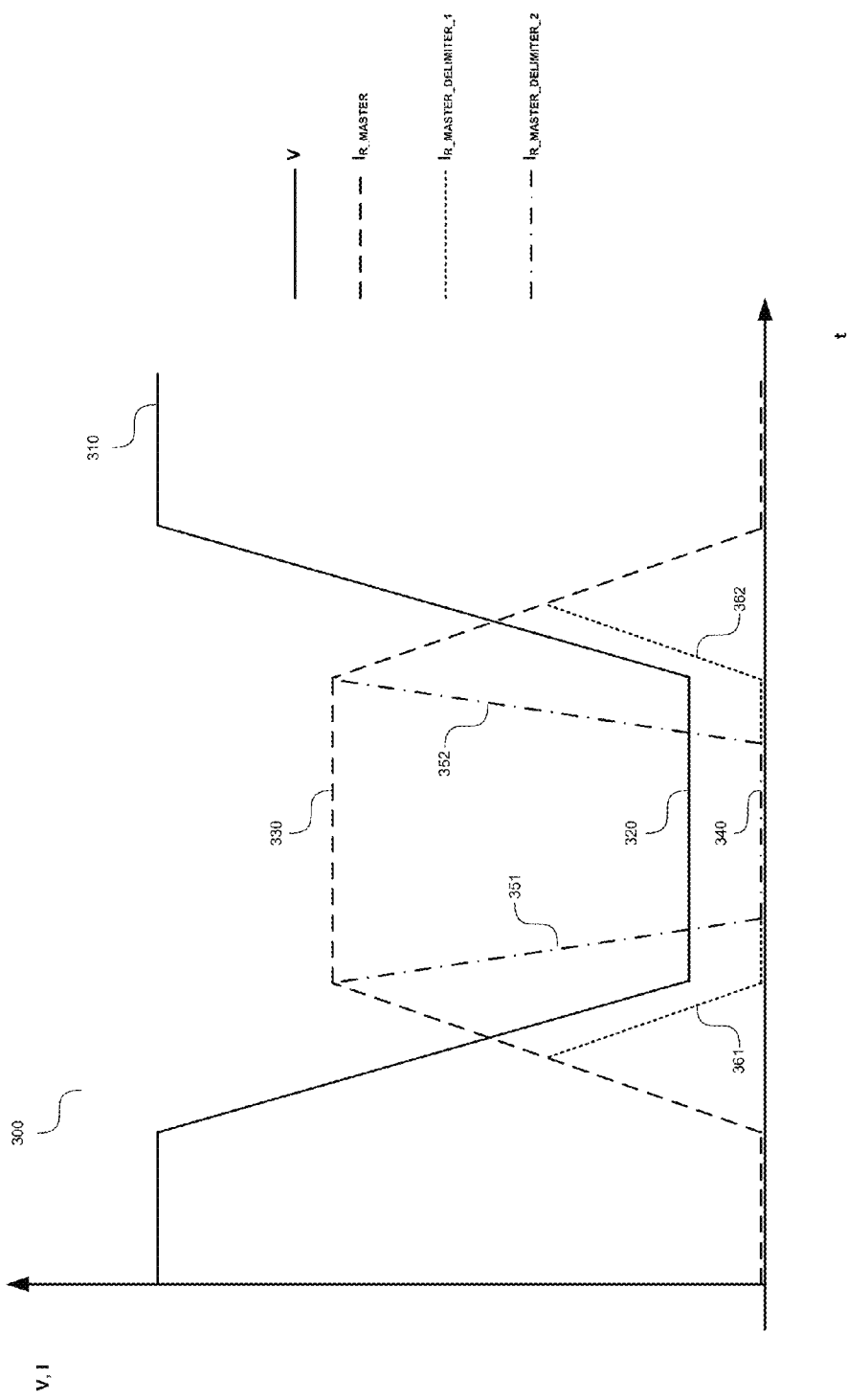
FIG. 3 shows plots for voltage and current levels in a network, in accordance with another example embodiment of the present disclosure.

FIG. 3 shows plots 300 for voltage and current levels in a network such as a LIN network, in accordance with another example embodiment of the present disclosure. The levels shown in and described in connection with FIG. 3 may, for example, be implemented with the apparatuses shown in one or both of FIGS. 1 and 2. As such, embodiments below are described in connection with these components by way of example.

The solid plot shows voltage on a bus (e.g., 270) with level 310 being a recessive level as discussed herein, as may be implemented via termination resistor 113 in series with the diode 112. Level 320 is a dominant level, as may be driven by the transmit low-side driver 114. The dashed line shows current supplied via a master control circuit, such as 110, with pull-up current at 330 while the bus is driven to the dominant level 320, as would proceed under operation without action of a current delimiter.

The dotted lines show operation of a current delimiter that engages at 351 on/after reaching the dominant level 320, or at 361 during transition of the bus from the recessive level to the dominant level. A reduction in power dissipation is achieved by delimiting the pull-up current 330 to a low value 340 while the master control unit transmits a dominant level 320 on the bus. The current delimiter disengages/ceases delimiting at 352 on/before the end of the dominant level, or as the bus returns to the recessive level at 362. Such approaches may, for example, be implemented with delimiter 111. In some implementations, the transitions between unlimited and delimited states are implemented with a fast transition as well as a slow transition.

In some embodiments, one or more approaches herein, such as shown in FIGS. 1-3, are implemented with a vehicle-based LIN. In one such embodiment, the apparatus 110 is arranged as in apparatus 200, which operates at a relatively low speed (e.g., a maximum of 20 kBd) with a serial bus protocol. The LIN bus is a single-wire, wired AND bus operated at vehicle battery voltage (e.g., of an automobile) related recessive level, and ground region as dominant level. The LIN bus signal is pulled to a LIN recessive level (e.g., 310 of FIG. 3) via LIN termination resistors, which are in series with a diode respectively. The LIN dominant level (e.g., 320 of FIG. 3) is driven by low-side (transmit) drivers of the LIN ECUs.

Various different types of current delimiters and delimiter circuits are implemented to suit various applications. Referring to FIG. 1, in some implementations, the current delimiter unit 111 includes MOS-based transistors that switch the current path of the master pull-up resistor 113 with a smooth transition. The current is delimited when the switch is "open" (in a non-conducting state), and unlimited when the switch is "closed" (in a conducting state).

Figure 4:
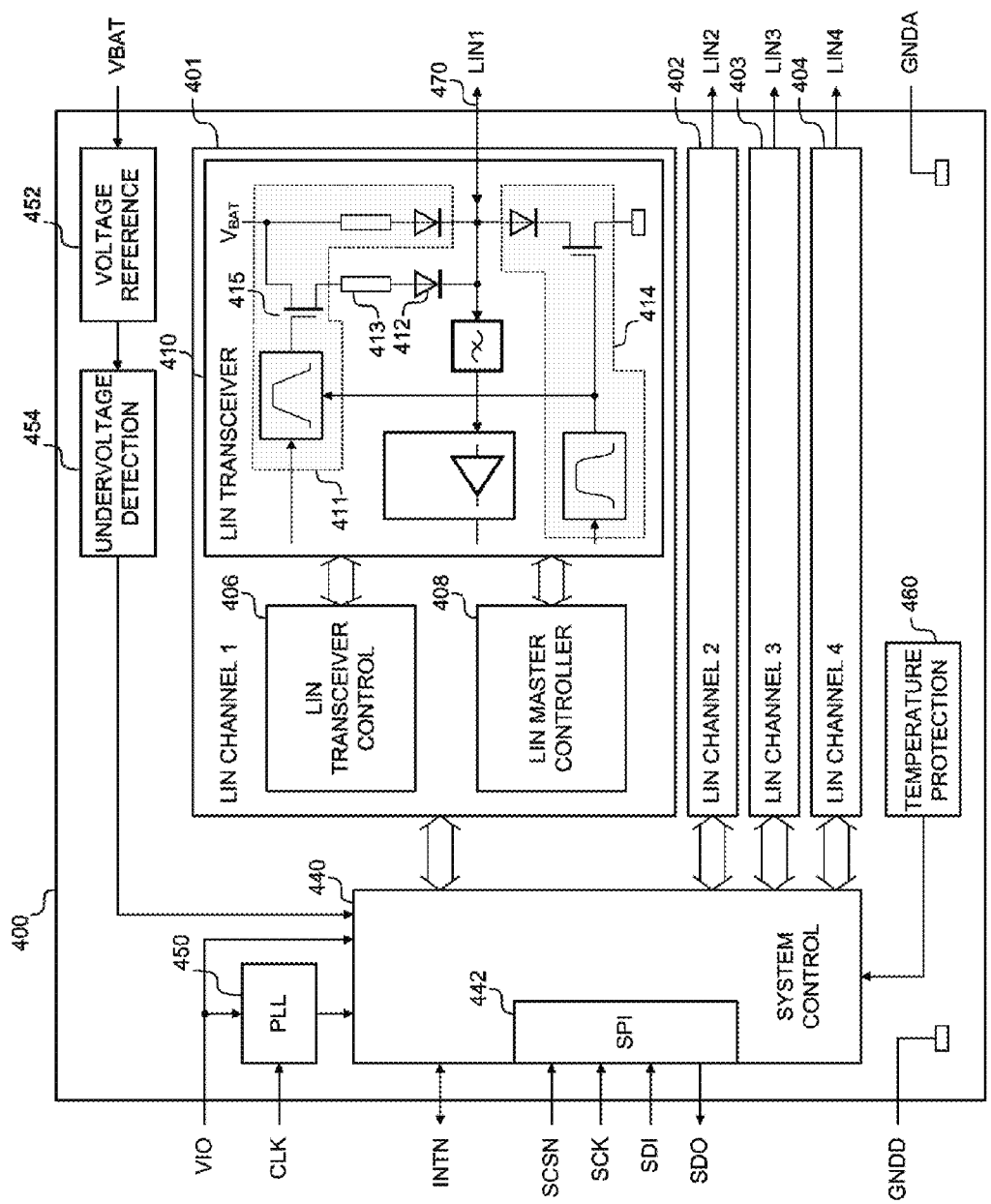
FIG. 4 shows a quad-channel LIN network control apparatus, in accordance with another example embodiment of the present disclosure.

FIG. 4 shows a quad-channel LIN network control apparatus 400, in accordance with another example embodiment. The apparatus 400 may, for example, be implemented in connection with the approaches and circuits shown in FIGS. 1-3. The apparatus 400 includes a plurality of communication circuits including four independent LIN master channels 401, 402, 403 and 404, with each channel being operated with a transceiver circuit 410 as shown for channel 401. The apparatus 400 also includes a system controller 440 having a serial peripheral interface 442 that operates to communicate serial data in (SDI) and serial data out (SDO) signals, as well as to receive clock signals. A phase-locked-loop (PLL) 450 generates an output signal to the system controller 440, using input clock CLK. A voltage reference generator 452 provides a reference voltage based upon a battery voltage input, and an undervoltage detection circuit 454 detects low voltage conditions (e.g., and provides protection therefrom). A temperature protection circuit 460 senses temperature of the apparatus 400 and generates an output for the system controller 440, which operates based upon the output (e.g., to shut down in an overheat condition).

The control circuit 401 includes an impedance-bias circuit including a diode 412 and LIN master pull-up resistor 413, as well as a current delimiter unit 411, and a transmitter unit 414 that transmits a LIN-dominant level for transmitting on bus 470. A LIN transceiver controller 406 controls the operating states of the LIN transceiver 410, and a LIN master controller 408 controls the transmission of signals on the bus (e.g., at dominant and recessive levels, as discussed above).

In some embodiments, the master controller 408 generates and communicates signals on the bus 470 by driving the bus 470 between a recessive level and a dominant level based upon the serial data and clock synchronization signal communicated via the serial peripheral interface 442. The transceiver controller 406 is a digital block that controls operating states of the transceiver 410, such as a normal operation state (while LIN communication takes place), low power operation state (while no LIN communication takes place), or a fail-safe operation state (e.g., after an over-temperature failure). The current delimiter 411 delimits the pull-up current using one or more approaches as described herein, and includes a transistor 415 that decouples the pull-up circuit from the battery power.

Figure 5:
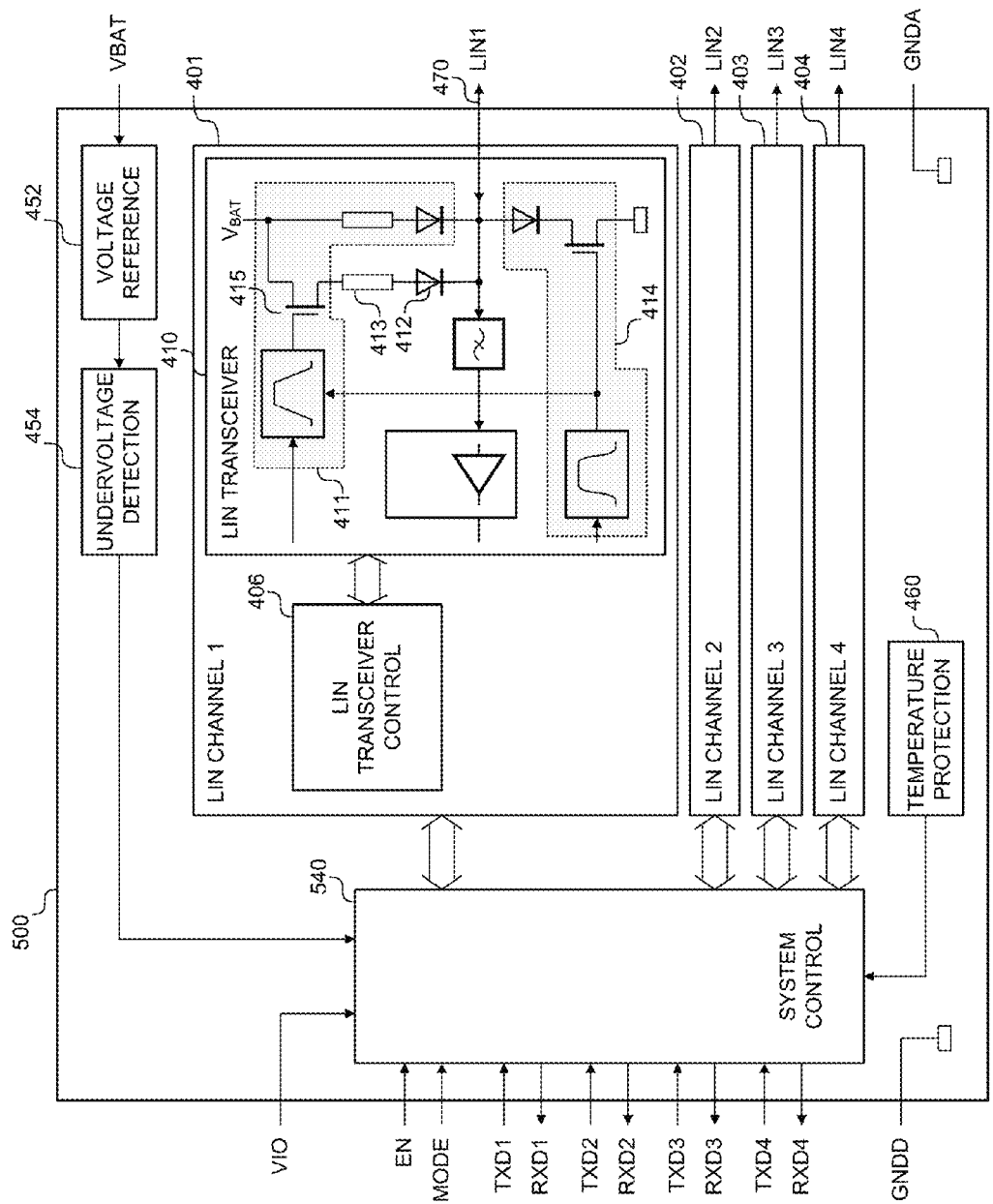
FIG. 5 shows another quad-channel LIN network control apparatus, with a TXD/RXD interface, in accordance with another example embodiment of the present disclosure.

FIG. 5 shows another quad-channel LIN network control apparatus 500, with a TXD/RXD interface 540, in accordance with another example embodiment of the present disclosure. The apparatus 500 is similar to the apparatus 400 shown in FIG. 4, with a subset of components having corresponding labels, and discussion thereof omitted for brevity. The TXD/RXD interface 540 can be used in place of the SPI 442 shown in FIG. 4. By way of example, the interface 540 is shown having four pairs of TXD/RXD lines, as well as enable (EN) and mode selection (MODE) inputs.

For general information regarding LIN networks, and for specific information regarding aspects of LIN networks in which various example embodiments of the present invention may be implemented, and regarding transceivers, impedance-bias, master controller circuits and other circuits as discussed herein, reference may be made to: the LIN Specification Version 2.2A (and other versions thereof), available from the LIN Consortium of Frankfurt, Germany; SAE J2602/1 LIN Network for Vehicle Applications, revised 2012, available from SAE International; and U.S. Pat. No. 7,688,113B2, all of which are fully incorporated herein by reference.

Various modules or other circuits may be implemented to carry out one or more of the operations and activities described herein and/or shown in the figures. In these contexts, a "module" is a circuit that controls and/or carries out one or more of these or related operations/activities (e.g., current delimiting, signal generation, or bus driving). For example, in certain of the above-discussed embodiments, one or more modules are discrete logic circuits or programmable logic circuits configured and arranged for implementing these operations/activities, as in the circuit modules shown in FIGS. 1, 2 and 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities. For instance, such a product may implement the control of apparatuses as described herein. One related example may involve effecting the operation of a communication circuit in accordance with the operation shown in FIG. 3.

Based upon the above discussion and illustrations, those skilled in the art will readily recognize that various modifications and changes may be made to the various embodiments without strictly following the exemplary embodiments and applications illustrated and described herein. For example, a multitude of communication channels may be implemented using control as discussed herein. Different approaches can be used for pulling up and/or delimiting a pull-up current. Such modifications do not depart from the true spirit and scope of various aspects of the invention, including aspects set forth in the claims.

What is claimed is:

1. An apparatus comprising:
   a voltage source;
   a master control circuit configured and arranged to transmit signals by driving a single-wire bus circuit at a dominant level and at a recessive level;
   an impedance-bias circuit configured and arranged with the voltage source to pull up a voltage level on the bus circuit, using a pull-up current that passes through the impedance bias circuit, while the master control circuit transmits the signals; and
   a current delimiter circuit connected between the voltage source and the impedance-bias circuit, the current delimiter circuit being configured and arranged to
      delimit the pull-up current in response to a transition of the bus circuit from the recessive level to the dominant level,
      maintain the delimiting until the bus circuit transitions to the recessive level,
      cease the delimiting of the pull-up current in response to a transition of the bus circuit from the dominant level to the recessive level, and
      maintain the cessation of the delimiting until the bus circuit is to be driven to the dominant level.

2. The apparatus of claim 1, wherein the current delimiter circuit is configured and arranged to delimit the pull-up current by restricting current flow from the apparatus onto the bus circuit.

3. The apparatus of claim 1, wherein the current delimiter circuit includes MOS-based transistors configured and arranged to
   delimit the pull-up current by one of: operating in a non-conducting state and operating as a constant-current source, and
   cease delimiting the pull-up current by operating in a conducting state.

4. The apparatus of claim 1, wherein the master control circuit is configured and arranged to transmit the signals by driving the bus circuit between the recessive and dominant levels while intermittently operating the current delimiter to delimit the pull-up current when the bus circuit is driven at the dominant level.

5. The apparatus of claim 1, wherein the master control circuit is configured and arranged with the current delimiter circuit to delimit the pull-up current by
   initiating delimiting the pull-up current during the transition of the bus circuit from the recessive level to the dominant level, and
   ceasing delimiting the pull-up current during the transition of the bus circuit from the dominant level to the recessive level.

6. The apparatus of claim 1, wherein the master control circuit is configured and arranged with the current delimiter circuit to delimit the pull-up current by
   initiating delimiting the pull-up current after the bus circuit has transitioned from the recessive level to the dominant level, and
   ceasing delimiting the pull-up current before the bus circuit has transitioned from the dominant level to the recessive level.

7. The apparatus of claim 1, further including a serial peripheral interface, wherein the master control circuit is configured and arranged to generate and communicate signals on respective channels on the bus circuit based upon serial data and a clock synchronization signal received via the serial peripheral interface.

8. The apparatus of claim 1, wherein the impedance-bias circuit is a pull-up circuit.

9. The apparatus of claim 1, wherein the master control circuit is configured and arranged to
   drive the bus circuit at the dominant level by driving the bus circuit at a ground-region level, and operate the bus circuit at the recessive level by operating the bus circuit at a voltage level provided by a battery.

10. The apparatus of claim 1, further including the single-wire bus circuit, a master circuit, and a plurality of slave circuits connected in series with the master circuit on the single-wire bus circuit, wherein the master circuit includes the voltage source and an integrated circuit chip having the master control circuit, the impedance-bias circuit and the current delimiter circuit.

11. An apparatus comprising:
a voltage regulator configured and arranged to regulate supply voltage provided by a battery;
a system controller circuit having a serial peripheral interface and being configured and arranged to communicate serial data, a chip select signal and a clock synchronization signal using the regulated supply voltage; and
a plurality of communication circuits configured and arranged to, using the regulated supply voltage, communicate data on a single-wire bus circuit using a channel that operates independently from a channel of at least another one of the communication circuits, each communication circuit including
a master control circuit configured and arranged to generate and communicate signals on the channel by driving the single-wire bus circuit between a recessive level and a dominant level based upon the serial data and clock synchronization signal communicated via the serial peripheral interface, and
a transceiver control circuit including
a pull-up circuit configured and arranged to use power from the battery to pull up a voltage level on the single-wire bus circuit, using a pull-up current that passes through the pull-up circuit, and
a current delimiter configured and arranged to begin to delimit the pull-up current in response to the master control circuit driving the single-wire bus circuit from the recessive level to the dominant level, maintain the delimiting while the bus circuit is at the dominant level, and to cease the delimiting of the pull-up current in response to the master control circuit driving the single-wire bus circuit from the dominant level to the recessive level, and maintain the cessation of the delimiting until the master control circuit generates signals indicating a transition of the bus circuit to the dominant level.

12. The apparatus of claim 11, wherein the current delimiter includes a transistor configured and arranged to delimit the pull-up current by decoupling the pull-up circuit from the voltage regulator.

13. The apparatus of claim 11, wherein the pull-up circuit includes a resistor and a diode connected in series, one of the resistor and the cathode of the diode being connected to the single-wire bus circuit.

14. The apparatus of claim 11, wherein the transceiver control circuit is configured and arranged to delimit the pull-up current by
initiating delimiting the pull-up current during a transition of the bus circuit from the recessive level to the dominant level, and
ceasing delimiting the pull-up current during a transition of the bus circuit from the dominant level to the recessive level.

15. The apparatus of claim 11, wherein the transceiver control circuit is configured and arranged to delimit the pull-up current by initiating delimiting the pull-up current after the bus circuit has transitioned from the recessive level to the dominant level, and
ceasing delimiting the pull-up current before the bus circuit has transitioned from the dominant level to the recessive level.

16. The apparatus of claim 11, further including
the single-wire bus circuit,
a master circuit connected to the single-wire bus circuit and having an integrated circuit chip that includes the voltage regulator, the system controller and the plurality of communication circuits, and
a plurality of slave circuits connected in series with the master circuit on the single-wire bus circuit, the slave circuits being configured and arranged to communicate on the single-wire bus circuit in response to a communication initiated by the master circuit.

17. A method comprising:
transmitting signals by driving a single-wire bus circuit at a dominant level and at a recessive level;
using a voltage source, pulling up a voltage level on the bus circuit while the signals are transmitted, by passing a pull-up current to the bus circuit;
delimiting the pull-up current in response to a transition of the bus circuit from the recessive level to the dominant level;
maintaining the delimiting while the bus is driven to the dominant level,
ceasing the maintaining of the delimiting of the pull-up current in response to a transition of the bus circuit from the dominant level to the recessive level; and
maintaining the cessation of the delimiting until a control circuit indicates the bus circuit is to be driven to the dominant.

18. The method of claim 17, wherein transmitting signals includes
at a master circuit, driving the single-wire bus circuit at the dominant and recessive levels to transmit first data to at least one of a plurality of slave circuits connected in series with the master circuit on the single-wire bus circuit, while delimiting the pull-up current when the single-wire bus circuit is driven at the dominant level, and
at one of the slave circuits, transmitting second data to the master circuit by driving the single-wire bus circuit in response to the transmitted first data.

19. The method of claim 17, wherein
delimiting the pull-up current includes initiating delimiting the pull-up current during the transition of the bus circuit from the recessive level to the dominant level, and
ceasing delimiting the pull-up current includes ceasing delimiting of the pull-up current during the transition of the bus circuit from the dominant level to the recessive level.

20. The method of claim 17, wherein
delimiting the pull-up current includes initiating delimiting the pull-up current after the bus circuit has transitioned from the recessive level to the dominant level, and
ceasing delimiting the pull-up current includes ceasing delimiting the pull-up current before the bus circuit has transitioned from the dominant level to the recessive level.

* * * * *